June 11, 1968  R. L. LICH  3,387,569
RAILWAY TRUCK AND SPRING BOLSTER STRUCTURE
Filed Jan. 24, 1966  3 Sheets-Sheet 1
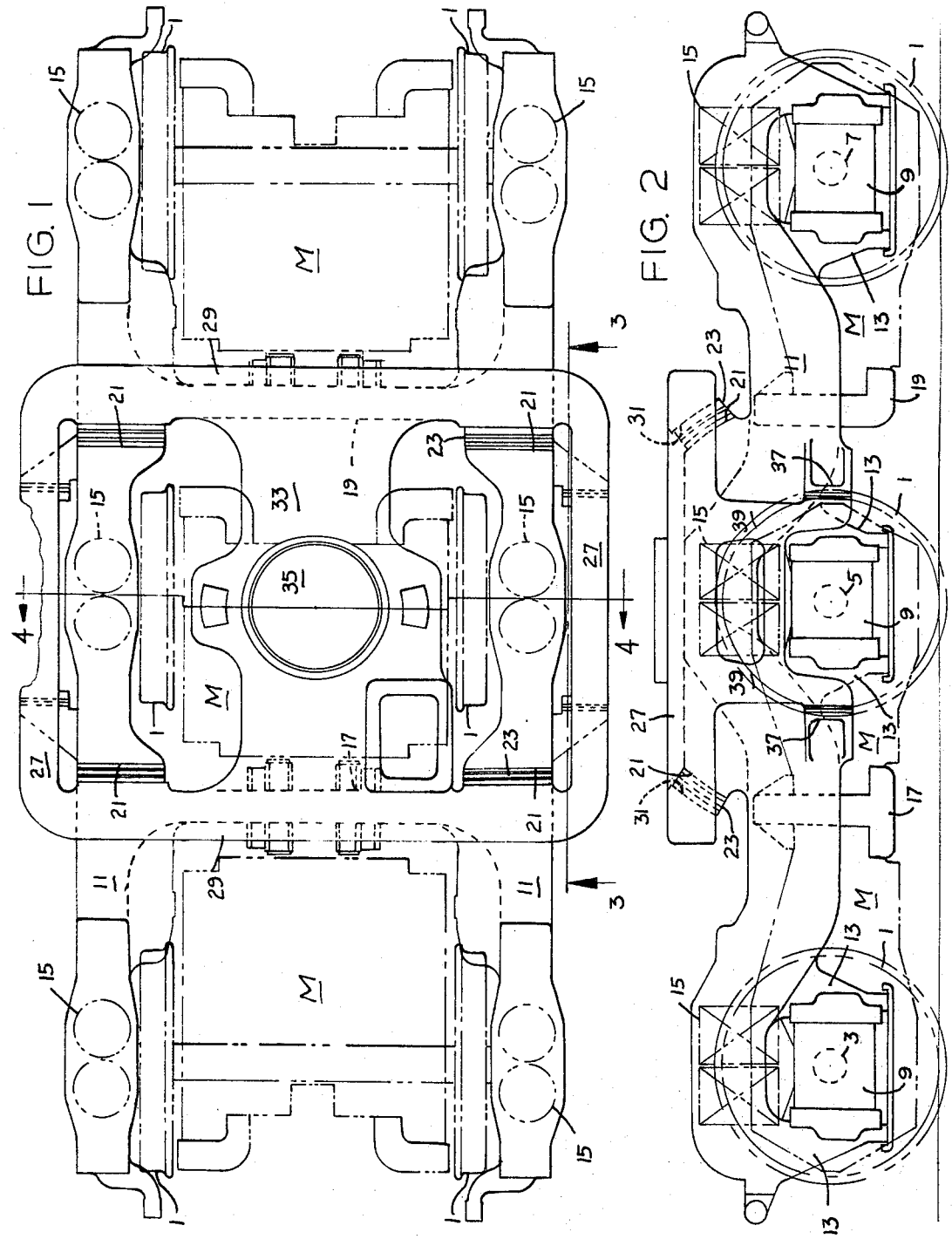
INVENTOR:
RICHARD L. LICH
BY Bedell & Burgess
ATTORNEYS June 11, 1968 R. L. LICH 3,387,569
RAILWAY TRUCK AND SPRING BOLSTER STRUCTURE
Filed Jan. 24, 1966 3 Sheets-Sheet 2

INVENTOR:
RICHARD L. LICH
BY Bedell & Burgess
ATTORNEYS

June 11, 1968  R. L. LICH  3,387,569

RAILWAY TRUCK AND SPRING BOLSTER STRUCTURE

Filed Jan. 24, 1966  3 Sheets-Sheet 3

INVENTOR:
RICHARD L. LICH
BY Bedell & Burgess
ATTORNEYS

United States Patent Office 3,387,569
Patented June 11, 1968

3,387,569
RAILWAY TRUCK AND SPRING
BOLSTER STRUCTURE
Richard L. Lich, St. Louis, Mo., assignor to General
Steel Industries, Inc., Granite, City, Ill., a corporation of Delaware
Filed Jan. 24, 1966, Ser. No. 522,767
14 Claims. (Cl. 105—196)

ABSTRACT OF THE DISCLOSURE

A railway vehicle truck in which the bolster is supported on each side of the rigid truck frame by a pair of elastomeric pad devices inclined lengthwise of the truck with their normals converging at a substantially lower level than the pad devices and longtudinal force transmitting means connecting the bolster and frame at the same lower level. This arrangement permits the bolster and frame to tip lengthwise of the truck with respect to each other, thus making equalizers unnecessary without requiring a very soft bolster spring support on the frame, and provides a low level transmission of tractive forces to minimize axle-to-axle weight transference.

---

The invention relates to railway rolling stock and consists of an improved railway vehicle truck, particularly for locomotives.

Trucks with three or more axles have been provided with means for supporting the locomotive underframe directly on the truck frame. Such trucks are advantageous in that they have a minimum number of parts and permit a very low underframe height, as compared with trucks on which the locomotive underframe is supported by a bolster spring-supported on the truck frame. In the first-mentioned trucks, in which the locomotive underframe is directly, i.e., nonresiliently, supported on the truck frame, it is necessary that the truck frame be supported from the axles in such a way as to accommodate the wheels to vertical curvature in the track even though the truck frame remains parallel to the underframe. Such support of the truck frame from the axles usually comprises an equalizing system. In trucks of the second type, equalizing systems are frequently dispensed with and the truck frame is supported directly on springs carried on the axle boxes. In such trucks the frame-supporting springs tend to maintain the truck frame parallel to the track, and it is necessary that the springs supporting the bolster be sufficiently soft to permit the frame to tip relative to the locomotive underframe to accommodate vertical curvature in the track. While trucks of this type have the advantage of eliminating the equalizing system, they do not provide the low underframe height offered by the first-mentioned trucks.

It accordingly is a main object of the invention to provide, in a relatively long wheel base truck, means for freely accommodating longitudinal tipping of the truck frame relative to the vehicle underframe supported thereby.

A further object is to provide, in such a truck, means for minimizing load transference.

A further object is to provide a six wheel truck in which the body supporting bolster is supported on the truck frame so as to tilt relative to the frame about an axis concentric with the middle axle.

An additional object is to provide a truck in which longitudinal forces are transmitted between the frame and bolster at substantially the height of the axles, whereby to minimize load transference.

The foregoing and additional more detailed objects and advantages will appear from the following description with reference to the accompanying drawings in which:

FIG. 1 is a top view of a railway truck embodying the invention.

FIG. 2 is a side elevational view of the truck illustrated in FIG. 1.

Figure 3:
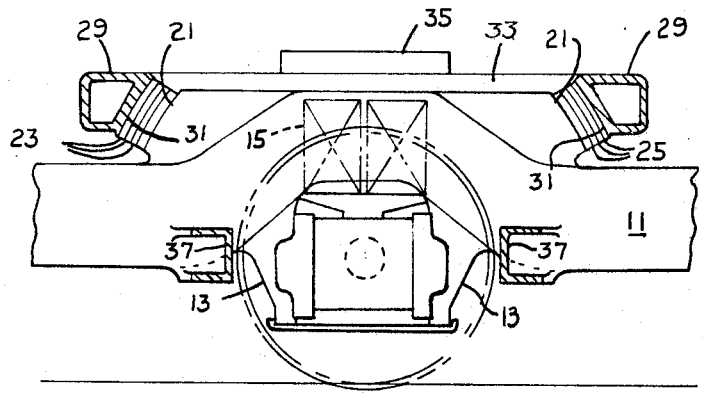
FIG. 3 is a fragmentary longitudinal vertical sectional view along line 3—3 of FIG. 1.
Figure 4:
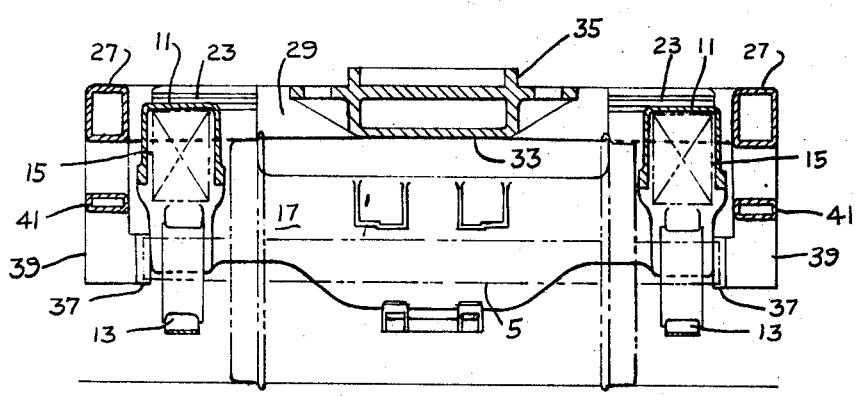
FIG. 4 is a transverse vertical sectional view along line 4—4 of FIG. 1.

The truck comprises flanged wheels 1, pairs of which are rigidly mounted on spaced axles 3, 5 and 7, the ends of which are rotatably mounted in journal boxes 9.

A rigid truck frame comprising transversely spaced longitudinally extending side members 11, formed with spaced pairs of depending pedestal legs 13, between which are vertically slidably received journal boxes 9, is supported on the latter by means of upright coil springs 15. Intermediate middle axle 5 and end axles 3 and 7, frame side members are rigidly connected to each other by longitudinally spaced transversely extending transom members 17 and 19.

Traction motors M and associated gear boxes are mounted on axles 3, 5 and 7 and are supported in conventional manner from transoms 17 and 19.

Because of the spacing lengthwise of the truck of frame-supporting springs 15 the truck frame will remain substantially parallel to the track surface at all times so that any substantial vertical curvature in the track will cause frame 11, 17, 19 to tip correspondingly with respect to the locomotive underframe. To permit such tipping of the truck frame relative to the rigid locomotive underframe which is supported at its opposite ends on similar trucks, the tops of truck frame side members 11 are provided with a pair of oppositely inclined transverse surfaces 21, 21 spaced lengthwise of the truck from each other and disposed on opposite sides of middle axle 5. Surfaces 21, 21 are curved about the middle axle as an axis, so that the intersection of their normals is at a substantially lower level. Surfaces 21 mount similarly curved sandwiches comprising pads 23 of rubber or other elastomeric material interleaved with and bonded to metal plates 25, pads 23 being substantially yieldable in shear both transversely of the truck and arcuately with respect to the middle axle.

A rigid bolster, comprising longitudinal members 27, 27 positioned outwardly of frame side members 11, and transversely extending cross members 29, 29 overlying transoms 17 and 19, is supported on sandwiches by correspondingly inclined curved surfaces 31 on the inner sides of cross members 29, so as to permit frame 11, 17, 19 to tip lengthwise of the locomotive, through arcuate shear in pads 23. Bolster 27, 29 also includes a longitudinal central member 33, rigidly connecting cross members 29. At its center, over middle axle 5, central member 33 is formed with a circular center plate 35, arranged for pivotal and load supporting engagement with a mating center plate (not shown) depending from the supported locomotive underframe.

For transmitting longitudinal (acceleration and retardation) forces from the truck frame to the bolster, truck frame side members 11 are formed with a pair of outwardly-extending brackets 37 at the same level as the axles, and at equal distances forwardly and rearwardly of the middle axle. Brackets 37 have flat transverse surfaces facing the middle axle, and bolster side members are formed with legs 39 depending to the level of brackets 37 and having flat transverse surfaces facing away from the middle axle for sliding engagement with opposing surfaces of brackets 37. Legs 39 are spaced apart a greater distance lengthwise of the truck than the middle axle pedestal legs 13, to facilitate access to the middle axle journal boxes 9 and to provide adequate clearance for the same during such lateral movement of the bolster relative to the frame as is permitted by lateral shear in sandwiches 23, 25. For additional strength, legs 29 are connected to each other slightly above the journal boxes by longitudinal tie members 41. With this arrangement, longitudinal forces are transmitted between the truck frame and bolster at the level of the axles, thereby eliminating the load transference which would take place if the longitudinal force transmitting means were positioned, as in conventional trucks, at a substantially higher level than the axles.

Figure 5:
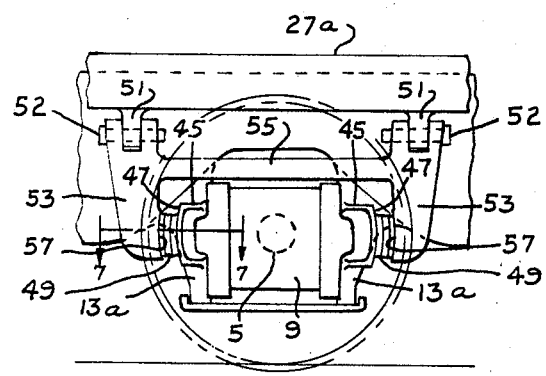
FIG. 5 is a fragmentary side elevation of the region of the middle axle, illustrating a modified form of longitudinal force transmitting means.
Figure 6:
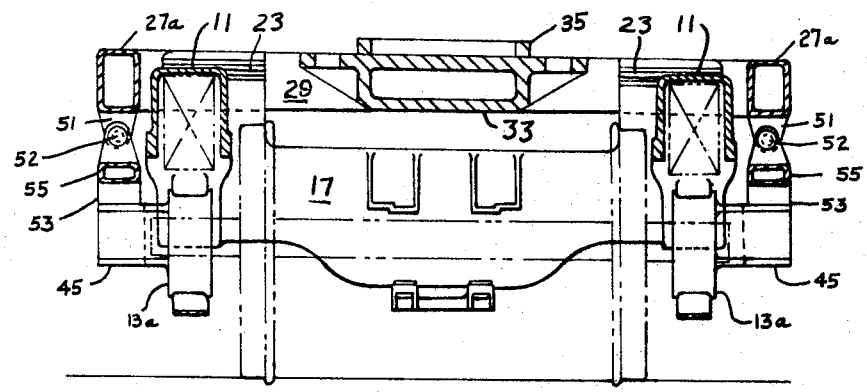
FIG. 6 is a transverse vertical sectional view corresponding to FIG. 4, but illustrating the modification shown in FIG. 5.
Figure 7:
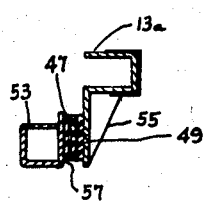
FIG. 7 is a fragmentary horizontal sectional view along line 7—7 of FIG. 5.

In another form of the truck, illustrated in FIGS. 5–7, different means are provided for transmitting longitudinal forces between the truck frame and bolster. Middle axle pedestal legs 13a are formed with transversely outwardly extending brackets 45 each having a convex transverse surface 47 curved about the axis of middle axle 5. A similarly curved sandwich 49 comprising a plurality of pads of rubber or similar elastomeric material interleaved with metal plates is mounted on each convex surface 47. Bolster side members 27a are formed with depending perforated brackets 51, to which are pivotally secured at 54 on a longitudinal axis, upright legs 53, connected to each other intermediate their ends by longitudinal tie member 55 to form a rigid yoke. The lower ends of legs 53 are formed with concave surfaces 57 facing the middle axle, the latter surfaces being secured to sandwiches 49, so that longitudinal tipping of the truck frame relative to the bolster will be accommodated by arcuate shear in sandwiches 49 about the midle axle as center. Transverse movements of the bolster relative to the truck frame are accommodated by a combination of pivotal movement of yokes 53, 55 on axes 54 relative to bolster side members 27a, and circular shear in sandwiches 49.

In both embodiments of the truck longitudinal tipping of the truck frame relative to the truck bolster and vehicle underframe mounted thereon, to accommodate the truck to vertical curvature of the track, is permitted by the yieldability in arcuate shear of sandwiches 23, 25 between the truck frame and bolster. Likewise, in both embodiments, lateral irregularities in the track are partially absorbed by the yieldability in shear transversely of the truck of sandwiches 23, 25.

In the first embodiment, longitudinal forces are transmitted by engagement of bolster legs 39 with frame brackets 37, there being sufficient clearance between these members lengthwise of the truck to accommodate tipping of the bolster and frame lengthwise of the truck relative to each other as permitted by sandwiches 23, 25.

In the second embodiment, longitudinal forces are transmitted between the frame and bolster side members 27a by frame brackets 45, compression in sandwiches 49, yokes 53, 53, pivot brackets 51, tipping of the bolster and frame relative to each other lengthwise of the truck being accommodated by the yieldability in arcuate shear of sandwiches 49.

The details of the trucks disclosed herein may be varied substantially without departing from the spirit of the invention and the exclusive use of those modifications coming within the scope of the appended claims is contemplated.

What is claimed is:

1. A railway vehicle truck comprising axles spaced apart lengthwise of the truck, wheels mounted on said axles, a rigid frame supported on both axles, generally upwardly facing transverse surfaces on said frame at a level substantialy higher than said axles, said surfaces being spaced apart transversely and longitudinally of the truck, said longitudinally spaced surfaces being oppositely inclined upwardly and inwardly toward each other longitudinally of the truck, similarly inclined elastomeric pads seated on said surfaces, a bolster element having complementary surfaces seated on said pads and means for swivelly supporting a vehicle body, the inclination of said surfaces being such that their normals intersect at a level substantially lower than said pads, and additional cooperating means on said frame and said bolster spaced apart transversely of the truck at substantially the same level as the intersection of said normals for transmitting longitudinal forces between said frame and said bolster and preventing swivelling movements of said frame and bolster with respect to each other.

2. A railway vehicle truck according to claim 1 in which said truck has two end axles and an axle intermediate said end axles, the intersection of said normals being in the same vertical plane as the axis of said middle axle.

3. A railway vehicle truck according to claim 2 in which said intersection coincides with the axis of said intermediate axle.

4. A railway vehicle truck according to claim 1 in which said pads are curved about the intersection of said normals, said normals forming the radii of curvature of said pads.

5. A railway vehicle truck according to claim 4 in which said truck has two end axles and an axle intermediate said end axles, the center of curvature of said pads lying in the same vertical plane as said intermediate axle.

6. A railway vehicle truck according to claim 5 in which the center of curvature of said pads coincides with the axis of said intermediate axle.

7. A railway vehicle truck according to claim 1 in which said longitudinal force transmitting means comprises a pair of transverse upright surfaces on said frame at each side, and structure depending from said bolster at each side of the truck and having a pair of transverse upright surfaces in opposing relation with said frame surfaces.

8. A railway vehicle truck according to claim 7 in which said opposing bolster and frame surfaces are adapted for sliding relation with each other.

9. A railway vehicle truck according to claim 7 in which elastomeric pads are positioned between and secured to said opposing upright surfaces.

10. A railway vehicle truck according to claim 9 in which said structures depending from said bolster are pivoted thereto on axes extending longitudinally of said truck to accommodate transverse movements of said bolster relative to said truck frame.

11. A railway vehicle truck according to claim 9 in which said upright surfaces and pads of said pairs are spaced apart lengthwise of the truck from each other and are curved about a common axis therebetween.

12. A railway vehicle truck according to claim 11 having end axles and an axle intermediate said end axles, said intermediate axle being positioned between the upright surfaces of said pairs and forming the axis about which said pads are curved.

13. A railway vehicle truck according to claim 7 having spaced apart end axles and an axle intermediate said end axles, said upright surfaces of said pairs being positioned on opposite sides of said intermediate axle.

14. A railway vehicle truck according to claim 13 in which said frame has depending pedestal legs embracing said intermediate axle and transversely outwardly extending brackets are formed on said pedestal legs, said frame upstanding surfaces being formed on said brackets.

References Cited

UNITED STATES PATENTS

| | | | |
|---|---|---|---|
| 1,484,954 | 2/1924 | Masury | 180—22 |
| 2,740,359 | 4/1956 | Travilla | 105—193 |
| 2,782,026 | 2/1957 | Hirst | 105—197 XR |
| 2,861,522 | 11/1958 | Rossell | 105—197 XR |
| 2,907,282 | 10/1959 | Erzer | 105—185 |
| 2,954,747 | 10/1960 | Hirst et al. | 105—196 |

ARTHUR L. LA POINT, *Primary Examiner.*

H. BELTRAN, *Assistant Examiner.*